United States Patent [19]

Kessler

[11] Patent Number: 4,759,593

[45] Date of Patent: Jul. 26, 1988

[54] HIGH RESOLUTION OPTICAL SCANNER

[75] Inventor: David Kessler, Rochester, N.Y.

[73] Assignee: Eastman Kodak Company, Rochester, N.Y.

[21] Appl. No.: 842,579

[22] Filed: Mar. 21, 1986

[51] Int. Cl.$^4$ .................. G02B 26/10; H04N 3/04
[52] U.S. Cl. ..................... 350/6.8; 350/6.6; 350/619; 250/236; 358/208
[58] Field of Search ............. 350/6.5, 6.7, 6.8, 3.71, 350/619, 6.6; 250/236; 358/208

[56] References Cited

U.S. PATENT DOCUMENTS

| | | | |
|---|---|---|---|
| 3,520,586 | 7/1970 | Bousky | 350/6 |
| 3,817,593 | 6/1974 | Harris et al. | 350/6 |
| 3,984,171 | 10/1976 | Hotchkiss | 350/7 |
| 4,247,160 | 1/1981 | Brueggemann | 350/6.8 |
| 4,253,724 | 3/1981 | Minoura et al. | 350/6.8 |
| 4,272,151 | 6/1981 | Balasubramanian | 350/6.6 |
| 4,368,488 | 1/1983 | Sakamoto | 358/208 |
| 4,397,521 | 8/1983 | Antos et al. | 350/6.8 |
| 4,424,442 | 1/1984 | Kitamura | 250/236 |
| 4,492,970 | 1/1985 | Lee et al. | 346/160 |
| 4,523,801 | 6/1985 | Baba et al. | 350/6.8 |
| 4,588,269 | 5/1986 | Kessler | 350/619 |
| 4,632,503 | 12/1986 | Karlsson | 350/6.8 |

Primary Examiner—John K. Corbin
Assistant Examiner—Loha Ben
Attorney, Agent, or Firm—Donald D. Schaper

[57] ABSTRACT

A high resolution optical scanner is disclosed for scanning a light beam onto a receiving medium. The scanner includes a light source for generating a light beam, optical means for anamorphically shaping the beam, and a rotatable polygon for moving the light beam through a predetermined scan angle. In order to obtain high resolution throughout a scan line, a mirror, having power in the tangential plane and in the sagittal plane, is positioned to intercept the beam from the polygon and direct it to the receiving medium.

14 Claims, 3 Drawing Sheets

HIGH RESOLUTION OPTICAL SCANNER

CROSS-REFERENCE TO RELATED APPLICATIONS

Reference is made to commonly-assigned U.S. patent application Ser. No. 627,932, entitled "Apparatus Which Shapes Gaussian Beams By Spherical Mirrors", filed in the name of David Kessler on July 5, 1984, now Pat. No. 4,588,269.

BACKGROUND OF THE INVENTION

1. Field of the Invention

The present invention relates to high resolution optical scanners, and more particularly, to an optical scanner which corrects for alignment errors of a scanning polygon.

2. State of the Prior Art

High resolution optical scanners can be defined as scanners which produce from 10,000–50,000 resolutions, or spots, per scan. Such scanners are used in the graphics arts for scanning an image to be recorded and for printing on a receiving medium. Certain high resolution scanners move an optical head such that the optical system itself is essentially an on-axis system. These scanners are relatively slow compared with scanners which deflect a laser beam across the medium. However, in the deflecting-type scanners complex optical designs are necessary to achieve a large number of resolvable spots on the receiving medium.

In U.S. Pat. No. 4,247,160, there is disclosed a laser beam scanner having a positive cylinder mirror located between the polygon deflector and a receiving medium. The positive cylinder mirror, which has power in the sagittal plane but has no power in the tangential plane, minimizes spot position errors due to alignment errors between adjacent facets of the polygon deflector. One problem with the patented scanner is that corrective optical elements must be used in combination with the cylinder mirror as, for example, a post-deflector lens with appropriate power in the tangential plane. These optical elements, in addition to adding to the complexity of the device, also introduce problems inherent in lenses, such as chromatic aberrations, which tend to limit the effectiveness of the scanner for high resolution scanning.

SUMMARY OF THE INVENTION

It is an object of the present invention to provide a high resolution optical scanner which overcomes the problems in the prior art discussed above. The scanner is corrected for alignment errors of adjacent facets of the polygon, and uses only a single post-deflector element.

In accordance with one aspect of the invention, there is provided a high resolution optical scanner for scanning a light beam onto a receiving medium, the scanner comprising: a light source for generating a light beam; optical means for anamorphically shaping the beam; deflector means for intercepting the beam from the optical means and for moving the light beam through a predetermined scan angle in a tangential plane; and a mirror having optical power in the tangential plane and in a sagittal plane normal to the tangential plane, the mirror being positioned to intercept the light beam from the deflector means and direct the beam to the medium.

In one embodiment of the present invention, a spherical mirror is positioned to intercept a beam from a light source and direct the beam to a scanner, and to intercept the beam from the scanner and direct the beam to a receiving medium.

Advantages of the disclosed scanner are that it has a flat field, constant scan velocity (f$\Theta$), it is corrected for pyramid error of the deflecting mirror, it is color corrected, telecentric, and has only one post-deflector element. The combination of these features result in a scanner with very high resolution. An additional feature of the scanner is that there is no need for a separate element to be used as an anamorphic beam shaper for the input beam; the spherical mirror itself can be used as the beam shaper. Thus, the input beam, which can be circularly symmetrical, is first reflected from the mirror to the scanner and is subsequently reflected from the mirror to the receiving medium.

Other features and advantages will become apparent from reference to the following description of the preferred embodiment when read in light of the attached drawings.

DESCRIPTION OF THE PREFERRED EMBODIMENT

As used herein the term "tangential" refers to the plane containing both the principal ray and the central axis of a symmetric optical system, that is, the plane of scan of the scanning beam; and the term "sagittal" means the plane containing the principal ray which is normal to the tangential plane, that is the plane extending in the cross-scan direction and normal to the plane of scan. The term "scan direction" refers to the direction of movement of the scanning beam across the receiving medium, and the term "cross-scan direction" refers to the direction of movement of the receiving medium relative to the scanning beam.

Figure 1:
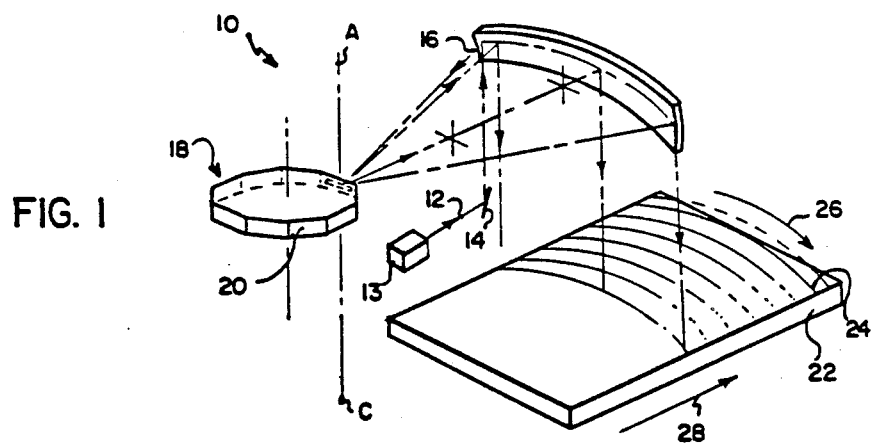
FIG. 1 is a perspective view of the scanner of the present invention.
Figure 2:
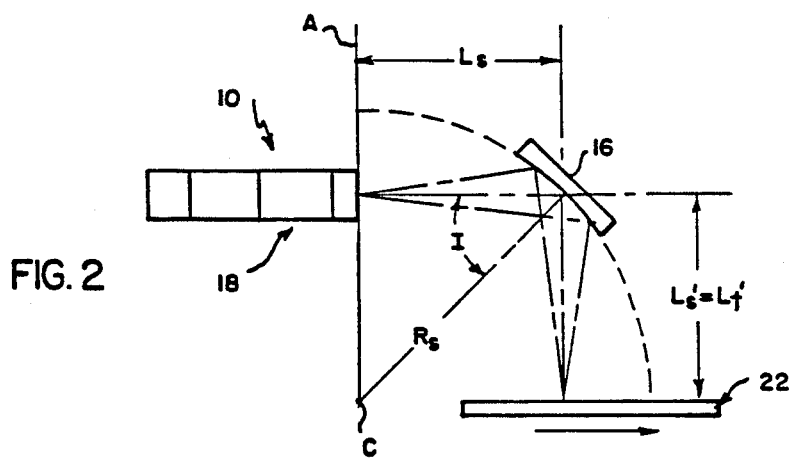
FIG. 2 is an elevational view showing the sagittal plane of the scanner.
Figure 3:
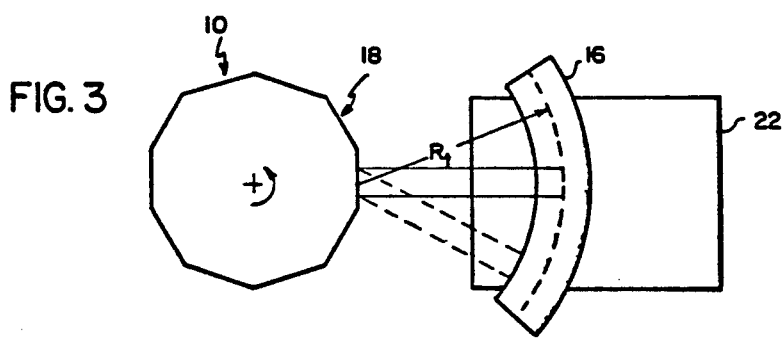
FIG. 3 is a plan view showing the tangential plane of the scanner.

With reference to FIG. 1, there is shown an optical scanner 10 constructed in accordance with the invention. A coherent light beam 12 from a light source 13 is directed by a mirror 14 to a spherical mirror 16. Light source 13 can be a conventional laser and can be modulated by an acousto-optic modulator (not shown) in a known manner. As shown in FIG. 2, mirror 16 has a radius of curvature $R_s$ which extends from a point C on an axis of symmetry A, and as shown in FIGS. 2 and 3, mirror 16 is monocentric with the axis of symmetry A. Mirror 16 directs beam 12 to a rotatable polygon 18 having a plurality of facets 20. The mirror 16 serves as an optical means to anamorphically shape the beam directed to polygon 18. As shown in FIG. 1, the beam 12 from mirror 16 to polygon 18 is located at a relatively large off-axis angle so as to induce astigmatism.

Polygon 18 serves as a deflector means for moving beam 12 through a predetermined scan angle. The polygon 18 directs the beam 12 back to spherical mirror 16 which in turn directs the beam onto a receiving medium 22 where scan lines 24 are formed. The scan direction of beam 12 is indicated by arrow 26, and the cross-scan direction is indicated by arrow 28. Preferably, the polygon 18 is driven at a constant angular velocity by a motor (not shown).

The receiving medium 22 can be a photosensitive member, for example, a photographic film, a photographic paper, a photoconductor used in a copier-duplicator, or any other means responsive to a source of light to produce an output image. The receiving member 22 is continuously driven in the cross-scan direction by suitable means (not shown). It will be understood that the beam 12 is line scanned at a much higher speed than the speed of the recording medium. The light beam 12 need not be monochromatic; it can also be polychromatic if it is desired to produce colored prints. The operation of polygons, lasers, optics, and modulators are well understood in the art. For a more complete description of their operations, see Urbach et al, "Laser Scanning for Electronic Printing," Proceedings of the IEEE, 597 (June, 1982).

The polygon 18 can be positioned on the axis of symmetry A, as shown in FIG. 1. The location of the elements of scanner 10 can be determined by Coddington's equations, as follows:

$$\frac{1}{L_s} + \frac{1}{L_{s'}} = \frac{2}{R_s \cos(I)} \quad (1)$$

where $L_s$ is the object-to-mirror distance in the sagittal plane;

$L_{s'}$ is the mirror-to-image distance in the sagittal plane;

I is the tilt angle of mirror 16 (FIG. 2) which is the angle between the center line of the light beam which contacts the mirror surface and a line normal to the mirror surface at the point of contact of the center line; and $R_s$ is the radius of curvature of the mirror 16 in the sagittal plane.

$$\frac{1}{L_t} + \frac{1}{L_{t'}} = \frac{2\cos(I)}{R_t} \quad (2)$$

where $L_t$ is the object-to-mirror distance in the tangential plane;

$L_{t'}$ is the mirror-to-image distance in the tangential plane;

I is the tilt angle of mirror 16;

$R_t$ is the radius of curvature of the mirror in the tangential plane.

For a spherical mirror:

$$R_s = R_t = R \quad (3)$$

When an input beam is collimated in the tangential plane and focused in the mirror in the sagittal plane, the following exists:

$$L_t = \infty \quad (4)$$

$$L_s = R \cos(I) = R/\sqrt{2} \text{ (for } I=45°) \quad (5)$$

Solving the Coddington equations for $L_{s'}$ and $L_{t'}$ produces the following:

$$L_{s'} = R/\sqrt{2} \quad (6)$$

$$L_{t'} = R/\sqrt{2} \quad (7)$$

From the above equations it will be seen that the beam 12 is focused in both scan and cross-scan directions on the receiving medium 22. It should also be noted that the polygon 18 and the receiving medium 22 are conjugate in the cross-scan direction. Thus, the system is corrected for polygon pyramid error.

The optical scanner 10 has a flat field, that is the receiver plane is flat. However, as shown in FIG. 1, the scan line is an arc with a radius of $R/\sqrt{2}$. Thus in the case of a printer, if the information which is to be printed is derived from a rectilinear source, it may have to be converted before it can be fed to the printer. Electronic means for performing such a conversion are known in the art. There is no need for data conversion when both the scanning and printing are done by systems with curved scan lines. (See, for example, the embodiment shown in FIG. 6, which wil be discussed hereinafter.) The scanner 10 is an fΘ system since the scan position along the curved scan line is proportional to the scan angle. Scanner 10, as shown in FIGS. 1–3, has a magnification of $-1$ in the cross-scan direction; thus, coma is corrected. The astigmatism in scanner 10 is used to affect the beam anamorphically, and the spherical aberration is small.

As noted previously, scanner 10 can be used without a separate anamorphic beam shaper for the input beam, since the mirror 16 is used as the shaper. The input beam 12, which can be circularly symmetrical, is reflected off the mirror 16, as shown in FIG. 1. One example of a polygon 18 which can be used in optical scanner 10 is a polygon having twelve facets 20, a diameter of 10 inches, and a duty cycle of 50%; thus, the total beam scan angle is 30°. The wavelength of beam 12 can be, for example, 0.83 microns, and the scanning beam radius is 21 microns. The displacement of a facet 20 along the optical axis during scanning is 1.1 mm. The beam size variation in the cross-scan direction due to this displacement is below 20%.

Scanner 10 can also be used with a scanning beam having a radius less than 21 microns. However, in this case, the beam size variations in the cross-scan direction may be too large due to the axial translation of the polygon facets 20 as the polygon 18 rotates. To correct for this, a small cylindrical lens (not shown) can be positioned in the input beam and moved along the optical axis in synchronism with the polygon to compensate for the beam waist displacement in the cross-scan direction. The size of beam 12 in the scan direction is not affected by the facet displacement, since beam 12 is collimated in the scan direction.

It is also possible to operate the scanner 10 with a galvanometer (not shown), or a one-facet polygon (not shown), positioned on axis A, instead of the polygon 18. Such an arrangement can achieve a very large number of resolvable spots. In one such scanner, using a galvanometer, R is 901.6 mm, the scan length is 13 inches, and the scanning beam size radius to the $1/e^2$ point is 11 microns. For a sampling distance of 14 microns and a wavelength of beam 12 of 0.83 microns, over 23,000 resolvable spots are achieved. The radius of the curved scan line is 637.5 mm.

Figure 4:
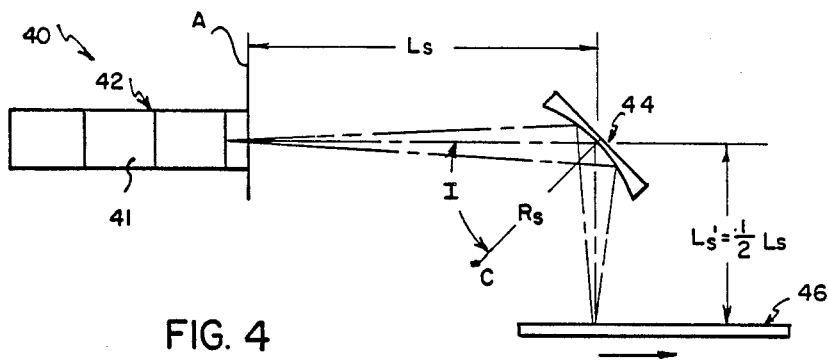
FIG. 4 is an elevational view of another embodiment of the invention.
Figure 5:
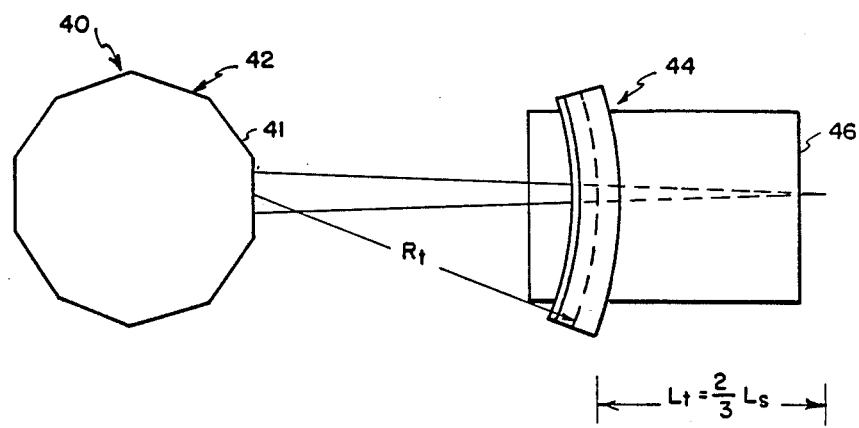
FIG. 5 is a plan view of the embodiment shown in FIG. 4.

A further embodiment of applicant's invention is shown in FIGS. 4 and 5 in which there is disclosed an optical scanner 40 having a rotatable polygon 42, a toroid mirror 44 and a receiving medium 46. Scanner 40 is generally similar to scanner 10, with the exception that the toroid mirror 44 is used instead of the spherical mirror 16. Toroid mirror 44 can have a spherical or ellipsoidal profile in the sagittal plane and is circularly symmetrical about the axis A in the tangential plane. The letter designations, used for distances and the angle in scanner 40 (FIGS. 4 and 5), are the same as those used for scanner 10, and Coddington's equations can be solved for scanner 40 in the same manner as for scanner 10.

The input beam to toroid mirror 44 must be shaped to converge in the scan direction. Such beam shaping can be done with a cylindrical lens (not shown) located between laser 10 and mirror 44. A balance between the tangential and sagittal image curvature is achieved for magnification of −0.5 in the sagittal and +0.5 in the tangential planes. Since the longitudinal magnification is now 0.25 in both directions, the image depth of focus is reduced by a factor of 4 and the scanning beam size can be half the size of the one used with a spherical mirror. An advantage of using toroid mirror 44 is that the effects of axial displacement of facets 41 of the polygon 42 are minimized.

Figure 6:
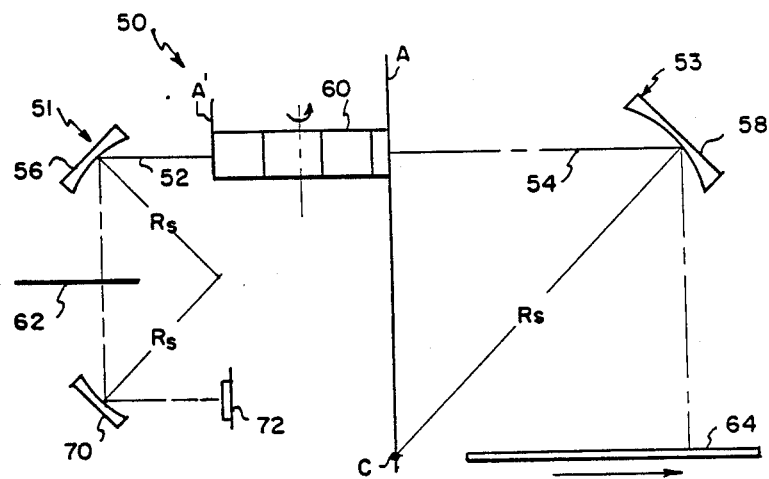
FIG. 6 is an elevational view of yet another embodiment of the invention which includes both an input scanner and an output scanner.

Another embodiment of applicant's invention is shown in FIG. 6 in which there is disclosed an optical scanner 50 having an input scanner 51 and an output scanner 53, each of which functions generally in the same manner as scanner 10. Input scanner 51 comprises a spherical mirror 56 positioned to direct a beam 52 from a polygon 60 onto an object to be recorded, e.g., a film 62; and output scanner 53 comprises a spherical mirror 58 positioned to direct a beam 54 from polygon 60 onto a receiving medium 64. It will be understood that spherical mirror 56 receives beam 52 from a source (not shown) and directs beam 52 to polygon 60 at an angular position (on axis A') at one side of polygon 60; and mirror 58 receives beam 54 from a source (not shown) and directs beam 54 to polygon 60 at another angular position (on axis A) at an opposite side of polygon 60. A spherical mirror 70 is positioned to receive beam 52 after it passes through film 62 and direct the beam to a light detector 72. Signals from detector 72 can be processed and used to modulate beam 54 in a manner well known in the art.

Input scanner 51 and output scanner 53 can have different format sizes as long as the scaling factors are the same in the scan and cross-scan directions. Although input scanner 51 and output scanner 53 are shown as both functioning with polygon 60, it will be apparent that a separate polygon could be used with each scanner 51, 53. Scanner 50 is especially advantageous in that data manipulation due to the curved scan line is not needed.

Figure 7:
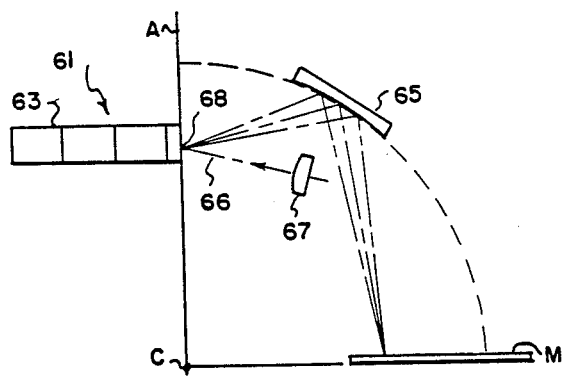
FIG. 7 is an elevational view of still another embodiment of the invention.

In FIG. 7, there is shown yet another embodiment of the present invention in which an optical scanner 61 comprises a rotating polygon 63 and a spherical mirror 65 for scanning a beam onto a receiving medium M. An input beam 66 is inclined, as shown in FIG. 7, to permit a symmetrical scan about a center scan point 68 on axis A. Since input beam 66 is not first directed against the spherical mirror 65 before being directed to polygon 63, as in scanner 10 (FIGS. 1-3), beam 66 must pass through optical means as, for example, a cylindrical lens 67, to provide an input beam to the polygon 63 which is focused on polygon 63 in the sagittal plane. The curvature of the scan line produced by scanner 61 will be somewhat different from the curvature of scan line 24 produced by scanner 10; however, the field flatness and fΘ properties are the same in both embodiments.

The invention has been described in detail with particular reference to a preferred embodiment thereof, but it will be understood that variations and modifications can be effected within the spirit and scope of the invention.

I claim:

1. A high resolution optical scanner for scanning a light beam onto a receiving medium, said scanner comprising:
    a light source for generating a light beam;
    optical means for anamorphically shaping said beam;
    deflector means for intercepting the beam from said optical means and for moving the light beam through a predetermined scan angle in a tangential plane, said deflector means intercepting said beam at an axis of symmetry which is generally perpendicular to said tangential plane; and
    a mirror having optical power in the tangential plane and in a sagittal plane normal to the tangential plane, said mirror being monocentric with said axis of symmetry, and said mirror being positioned to intercept said light beam from said deflector means and focus the beam on said medium and to optically conjugate said deflector means and said medium in the sagittal plane.

2. A scanner, as defined in claim 1, wherein said mirror is positioned to intercept said light beam from the source and to function as said optical means.

3. A scanner, as defined in claim 2, wherein said mirror is a spherical mirror.

4. A scanner, as defined in claim 1, wherein the beam from said source is supplied to said deflector means at an acute angle to said tangential plane.

5. A scanner, as defined in claim 4, wherein said optical means comprises a cylindrical lens.

6. A high resolution optical scanner which comprises:
    a light source for generating a light beam;
    a receiving medium;
    a light deflector for moving the light beam through a predetermined scan angle; and
    a mirror having optical power in the tangential and sagittal planes which is positioned to intercept said beam from the light source and to direct the beam to said scanner and to intercept the beam from said scanner and direct the beam to said receiving medium.

7. The optical scanner, as defined in claim 6, wherein said mirror is a spherical mirror.

8. The optical scanner, as defined in claim 6, wherein said mirror is a toroidal mirror.

9. An optical scanner for scanning first and second light beams generated by a light source, said scanner comprising:
    deflector means for scanning said first light beam through a first predetermined angle and said second light beam through a second predetermined angle; and
    mirror means having optical power in both tangential and sagittal planes which is positioned to intercept the first and second beams from said deflector means and direct the beams respectively to an object to be recorded and to a receiving medium, and scan lines traced by said beams on said object and on said receiving medium being of the same shape.

10. The optical scanner, as defined in claim 9, wherein said mirror means includes a first spherical mirror positioned to intercept said first beam and direct said first beam to the object to be recorded and a second spherical mirror positioned to intercept said second beam and direct said second beam to the receiving medium.

11. The optical scanner, as defined in claim 10, wherein said first spherical mirror is positioned to intercept said first light beam from said source and direct the first light beam to said deflector means, and said second spherical mirror is positioned to intercept said second light beam from said source and direct the second light beam to said deflector means.

12. The optical scanner, as defined in claim 11, wherein said deflector means comprises a rotatable polygon positioned to intercept said first beam from said first spherical mirror at one angular position thereof and said second beam from said second spherical mirror at another angular position thereof.

13. The optical scanner, as defined in claim 10, wherein a third spherical mirror is positioned to receive said first beam from said object to be recorded and direct said first beam to a detector.

14. A high resolution optical scanner for scanning a light beam onto a receiving medium, said scanner comprising a light source for generating a light beam, optical means for anamorphically shaping said beam, deflector means for intercepting said beam from said optical means and for moving the beam through a predetermined scan angle in a tangential plane characterized in that said deflector means intercepts said beam at an axis of symmetry which is generally perpendicular to said tangential plane, a mirror having power in tangential and sagittal planes is positioned to be monocentric with said axis of symmetry and to intercept said beam from said deflector means and direct the beam to said receiving medium, and said deflector means is optically conjugate with the receiving medium in said sagittal plane.

* * * * *